Patented Oct. 26, 1943

2,332,824

UNITED STATES PATENT OFFICE 2,332,824

PROCESS FOR PRODUCING VALUABLE WAX MODIFYING AGENTS

Philip L. Young, Westfield, N. J., assignor to Standard Oil Development Company, a corporation of Delaware No Drawing. Application May 11, 1938, Serial No. 207,382

10 Claims. (Cl. 260—475)

The present invention relates to the process of producing valuable wax modifying agents and to these new products, and likewise to waxy oils containing the same. The invention will be understood from the following description.

It has been found that valuable wax modifying agents can be produced by condensation of chlorinated waxy hydrocarbons, or olefins derived therefrom, and esters of aromatic acids. The halogenated wax is prepared by blowing paraffin wax, for example, that derived from petroleum with chlorine, for a time sufficient to combine 10 to 14% of chlorine with the wax. While the chlorinated wax is the preferred material, it will be understood that wax containing other halogens may be employed or that the olefins can be obtained from such chlorinated waxes by dehalogenation preferably under known conditions which lead to the least possible decomposition of carbon structure. Other halogenated aliphatic materials having long carbon chains of 10 or more carbon atoms can be employed, such as esters, alcohols, ketones and the like. These may contain chlorine in the same proportion as the chlorinated wax or may be unsaturated materials corresponding to the chlorinated derivatives.

The esters with which the above paraffinic compounds are condensed are esters of aromatic acids such as benzoic, salicylic, phthalic acid and its isomers. It is possible to use poly-carboxylic acids, that is to say containing more than two carboxyl groups, but preferably not to have more than about two substituent groups on the same carbon ring. The condensed ring acids which may be considered derivatives of naphthalene, anthracene, phenanthrene and the like, may be used as well as derivatives of benzol. The aromatic rings of the esters may be alkylated such as in methyl or ethyl benzoic acid, or propyl naphthenic acid, but the number of substituents on the aromatic ring should not be more than two or three including the carboxyl groups, so as to permit condensation with the aliphatic compound. Within the definition of aromatic acids, it is intended also to include the acids which are in fact aryl substituted aliphatic acids of the type of phenyl acetic acid, naphthyl butyric acid, cinnamic acid and the like.

The alcohols used in making such esters are likewise of various types, for example, the simple aliphatic alcohols such as methyl, ethyl, the propyl and the butyl alcohols may be employed, but the higher alcohols may also be used in producing esters such as lauryl, cetyl, stearyl and the like. While the alcohols mentioned above are saturated, it will be appreciated that unsaturated alcoholic esters may be used in the present process, for example, allyl phthalate, oleyl benzoate and the like. The monohydric alcoholic esters are preferably employed, but polyhydroxy alcoholic esters such as those of glycol and glycerine may be used if desired.

The two ingredients, that is the chlorinated or unsaturated paraffinic substance, such as chlorparaffin, and aromatic ester of the class described above, are used in proportions of about 10 of the former to one or two of the latter. The condensation is effected with Friedel-Crafts type catalysts such as aluminum chloride, zinc chloride and the like, in proportion from about 1 to 5% or even 10% of the chlorinated wax and at temperatures ranging from about room temperature to 200° F. or even 300° F. The preferred conditions vary with different materials, but it is generally preferable to carry out the reaction in the presence of a diluent such as naphtha, kerosene, carbon disulfide, tetrachlorethane or the like, but it may be carried out in absence of any solvent.

During the reaction which takes place in from two to ten hours, or more, hydrogen chloride is evolved and the materials are throughly agitated. After the reaction period, the catalytic sludge is hydrolyzed by the addition of water, alcohol or aqueous alkali, and the organic materials are separated from the inorganic products of catalyst hydrolysis. It is frequently desirable to add excessive solvent and thus extract organic materials from the inorganic. The liquid products are then distilled to say 600° F. in order to recover a distillation residue which is the desired wax modifier.

The product produced as above is added to a waxy oil in proportion of from 1 to 5%, depending on the particular modifier and the particular oil, in order to depress the pour point. These materials may also be used as wax separation aids and as such are added to waxy oils in the same general proportions as indicated above. The waxy oil is diluted with naphtha or kerosene or mixtures of these materials with well known wax precipitating solvent such as low boiling oxygenated solvents, for example, alcohols, ketones, esters and the like. This mixture is chilled to the wax solidification point and the actual separation is accomplished by filtration, sedimentation, centrifugation or the like. The wax modifier makes the separation more complete and smoother and in the presence of the modifiers it is possible to chill more rapidly, and filtration and sedimentation rates are increased.

Example No. I

The following proportion of reagents were used:

Chlor-wax (11% Cl) cc. 1,000 (@ 150° F.)
n-Butyl phthalate grams 100
AlCl₃ do 100

The chloro-wax and n-butyl phthalate were placed in a 3-liter-3-necked round bottom flask fitted with stirrer, thermometer and outlet for HCl gas. The stirrer was started and the temperature adjusted to 200° F. The AlCl₃ was slowly added over a period of 2 hours due to a very vigorous reaction. With the first addition of AlCl₃ a lumpy resinous material formed, but as further AlCl₃ was added this slowly went into solution. After the addition of the AlCl₃, the reaction temperature was slowly raised to 300° F. Vigorous evolution of HCl took place with rise in temperature and the reaction mixture increased considerably in viscosity. The reaction mixture was maintained at 300° F. for 3 hours. After a total reaction time of 5 hours, the mixture was cooled and diluted with 1000 cc. of kerosene and neutralized with a mixture of alcohol and water. After settling, the kerosene extract was distilled with fire and steam to 600° F. to remove unreacted materials. The product was obtained as the residue and gave a yield of 192 grams.

The pour depressor potency was tested by blending in a wax-bearing oil. The following result was obtained:

Pour point
Original oil °F +30
Original oil+1% product °F + 5
Original oil+5% product °F −20

Example II

The following proportion of reagents was used:

Chloro-wax (11% Cl) cc. 800 (@ 150° F.)
n-Butyl phthalate cc. 80
AlCl₃ grams 40

The experimental conditions of Example No. I were repeated except that the entire reaction was carried out at 300° F. for a period of 5 hours. After recovery of the product a yield of 46 grams was obtained. This indicates that a lower temperature of reaction (at least initially) is desirable.

The following pour depressor potency was obtained:

Pour point
Original oil °F +30
Original oil+1% product °F +15
Original oil+5% product °F 0

Example No. III

The following proportion of reagents was used:

Chloro-wax (11% Cl) 1,000 (@ 150° F.)
n-Butyl phthalate cc. 80
AlCl₃ grams 80

The chloro-wax was placed in a 3-liter flask fitted with thermometer, outlet for HCl gas, stirrer and dropping funnel. The AlCl₃ was added rapidly to the chloro-wax maintained at 130° F. over a period of 30 minutes. The temperature was then raised to 300° F. and the n-butyl phthalate was now slowly added drop by drop. After 2 hours reaction the mixture become extremely viscous and thick. After 2½ hours of reaction, the mixture was cooled and diluted with 1000 cc. of kerosene and neutralized with a mixture of alcohol and water. After settling the kerosene extract was distilled with fire and steam to 600° F. to remove unreacted products. A residue of 130 grams was obtained.

The following pour depressor potency was obtained:

Pour point
Original oil °F +30
Original oil+1% product °F +15
Original oil+5% product °F −10

Example No. IV

This example illustrates the application of B-naphthyl benzoate to the invention.

The following proportion of reagents was used:

Chloro-wax (11% Cl) cc. 800 (@ 150° F.)
Beta-naphthyl benzoate grams 80
AlCl₃ do 80

The experimental procedure of Example No. I was followed exactly. A yield of 205 grams of product was obtained.

The following pour depressor potency was obtained:

Pour point
Original oil °F +30
Original oil+1% product °F +20
Original oil+5% product °F −10

Example No. V

This example illustrated the application of phenyl benzoate to the invention.

This same proportion of reagents was used as described in Example No. IV, except that 80 grams of phenyl benzoate were used. The same experimental procedure as described under Example No. I was followed exactly. A yield of 235 grams of product was obtained.

The following pour depressor potency was obtained:

Pour point
Original oil °F +30
Original oil+5% product °F −10

The present invention is not to be limited unnecessarily by any theory of the mechanism of the reaction or by the use of any particular ingredients, but only to the following claims in which it is desired to claim all novelty inherent in the invention.

I claim:

1. The process which comprises mixing chlorinated paraffin wax containing about 11% chlorine with n-butyl phthalate, slowly adding aluminum chloride as catalyst thereto with stirring at a temperature not substantially exceeding 200° F. for a period of about two hours, then raising the temperature of the reaction mixture to about 300° F. for about three hours, cooling and diluting the reaction mixture with kerosene and hydrolyzing the catalyst with a mixture of alcohol and water, removing and distilling the kerosene extract with fire and steam at about 600° F. to recover the desired product as distillation residue.

2. A product soluble in mineral oil, having pour-depressing properties when added in small amounts to waxy mineral lubricating oils and substantially non-volatile at temperatures up to about 600° F. with fire and steam distillation, said product being a Friedel-Crafts condensation product of a condensible long chain aliphatic material selected from the group consisting of halogenated aliphatic materials having long carbon chains of at least 10 carbon atoms and corresponding olefins, with an ester of an aromatic carboxylic acid, said condensation product being formed by reacting said long chain aliphatic material with said aromatic ester in the presence of about 1–10% of a Friedel-Crafts catalyst at a temperature between about room temperature and about 300° F., separating the catalyst from the reaction products and subjecting the condensation products to distillation at about 600° F. to obtain the desired product as distillation residue.

3. Product according to claim 2 in which the condensation product is produced by condensing chlorinated wax with phenyl benzoate.

4. Product according to claim 2 in which the condensation product is produced from an aliphatic alcohol ester of a monobasic aromatic carboxylic acid.

5. Product according to claim 2 in which the product is produced from a saturated aliphatic alcohol ester of benzoic acid.

6. Product according to claim 2 in which the product is produced from an aliphatic alcohol ester of phthalic acid.

7. The process which comprises subjecting to a Friedel-Crafts condensation an ester of an aromatic carboxylic acid, and a condensable long chain aliphatic material selected from the group consisting of halogenated aliphatic materials having long carbon chains of at least 10 carbon atoms and corresponding olefins, at a temperature between about room temperature and about 300° F., removing the catalyst, and subjecting the reaction product to a distillation with fire and steam up to about 600° F. to recover the desired product as distillation residue.

8. The process which comprises subjecting to a Friedel-Crafts condensation an ester of an aromatic carboxylic acid, and a chlorinated paraffin wax having a chlorine content of about 10–14% and in the presence of about 1 to 10% of a Friedel-Crafts catalyst the percentage being based on the weight of condensable aliphatic substance, at a temperature between about room temperature and about 300° F. for a period of about 2 to 5 hours, using about 10 parts by weight of long chain aliphatic substance to about 1 to 2 parts of the aromatic ester, separating the catalyst from the products and subjecting the condensation products to distillation to about 600° F. to recover a residue having wax-modifying properties.

9. The process which comprises subjecting about 10 parts of chlorinated paraffin wax containing about 10–14% chlorine to chemical condensation with about 1 to 2 parts of n-butyl phthalate, in the presence of about 1–10% of aluminum chloride as catalyst based on the weight of chlorinated wax, at a temperature between the approximate limits of room temperature and about 300° F., hydrolyzing and removing the catalyst and distilling the reaction product with fire and steam distillation up to about 600° F. to recover as distillation residue a product soluble in mineral oil and having pour-depressing properties when added in small amounts to waxy mineral lubricating oils.

10. A product soluble in mineral oil, having pour-depressing properties when added in small amounts to waxy mineral lubricating oils and substantially non-volatile at temperatures up to about 600° F. with fire and steam distillation, said product being a Friedel-Crafts condensation product of chlorinated paraffin wax and n-butyl phthalate and being made by the process defined in claim 9.

PHILIP L. YOUNG.